United States Patent

[11] 3,603,668

| | | |
|---|---|---|
| [72] | Inventor | Dominick John DeBitetto<br>Briarcliff Manor, N.Y. |
| [21] | Appl. No. | 879,976 |
| [22] | Filed | Jan. 29, 1970<br>Division of Ser. No. 599,241, Dec. 5, 1966 |
| [45] | Patented | Sept. 7, 1971 |
| [73] | Assignee | U.S. Philips Corporation<br>New York, N.Y. |

[54] COMPOSITE DIFFRACTION GRATING FORMED FROM SUPERIMPOSED ALIGNED GRATINGS
2 Claims, 3 Drawing Figs.

[52] U.S. Cl. .................................................. 350/162 R,
264/1, 350/3.5
[51] Int. Cl. ........................................................ G02b 5/18,
G02b 27/38

[50] Field of Search .......................................... 350/162;
264/1

[56] References Cited
UNITED STATES PATENTS

| 2,463,280 | 3/1949 | Kaehni et al. .................. | 350/162 |
| 2,464,738 | 3/1949 | White et al. .................. | 350/162 X |
| 3,507,564 | 4/1970 | Franks .......................... | 350/320 |

*Primary Examiner*—John K. Corbin
*Attorneys*—Frank R. Trifari

ABSTRACT: A device for reconstructing a hologram using white light, by providing in the optical path before or after the hologram a dispersion-compensating element. A preferred embodiment employs a diffraction grating. A relatively efficient and inexpensive transmission diffraction grating is obtained by a pile of aligned, superimposed replicas having the same spacing.

PATENTED SEP 7 1971

3,603,668

*INVENTOR.*
D.J. DeBITETTO

BY

*[signature]*
AGENT

COMPOSITE DIFFRACTION GRATING FORMED FROM SUPERIMPOSED ALIGNED GRATINGS

This is a division of U.S. Pat. application Ser. No. 599,241, filed Dec. 5, 1966.

This invention relates to a device for viewing a hologram by means of white light, and to an improved transmission diffraction grating.

Holography is the technique for recording an image and reproducing same in three dimensions. Reference is made to a book entitled "AN INTRODUCTION TO COHERENT OPTICS AND HOLOGRAPHY," by G. W. Stroke, published in 1966 by Academic Press for a description of the principles of conventional holography. As is known, the image is recorded generally on a transparency using two monochromatic coherent light beams, such as that generated by a laser. The image is conventionally reconstructed using a similar laser. There has been recent interest in reconstructing such images by means of white light, so that such holograms can be reconstructed without the necessity of providing an expensive monochromatic coherent light source. Several methods for accomplishing this have already been described in the art. See "Proceedings of the IEEE—Proceedings Letters," Apr. 1966, pages 690–691; "Physics Letters," 20, Mar. 1, 1966, pages 368–370; "Applied Physics Letters," 9, Sept. 1, 1966, pages 215–217. The problem involved in white light reconstruction, partially solved in these publications, is that the hologram is basically a complicated form of an interference pattern which is used as a diffracting element during the reconstruction of the original wavefront. As a result, it is inherently very dispersive. In other words, each wavelength of the illuminating radiation interacts with the hologram pattern to form an image, but all of these images formed by the different wavelengths are at different positions in space. Hence, the entire image appears blurred and colored. These prior art publications solve the problem by, in effect, monochromatizing the radiation using a filter in the illuminating beam. In the technique described in the IEEE Proceedings, a Wratten filter was placed in the white light beam, thus eliminating most of the beam intensity except that within the band-pass of the filter. As was suggested by the above author, the broader the band-pass of the filter, the higher the image intensity, but the poorer the resolution. The image quality was improved by narrowing the filter band-pass but the intensity was considerably reduced and it became necessary to view the hologram in a darkened room. The second method described in the Applied Physics Letters and Physics Letters Journals provided a built-in interference filter in the hologram itself, and is thus similar to the other technique in that most of the illuminating beam is discarded resulting in a low intensity image.

My invention is based upon the recognition that the blurring resulting upon viewing the hologram with white light is due to the strong dispersion effected by the hologram, and that it is possible to refocus or recombine all of these dispersed images by means of an additional dispersive element provided in the optical path and arranged to "undisperse" the light by substantially the same amount but in the opposite direction as that afforded by the hologram itself. In my preferred device, I employ a diffraction grating as the dispersion-compensating optical element. It is provided with a grating spacing which is of the same order as the average fringe spacing in the hologram but is positioned using the opposite order number and angle to provide substantially the same equal angular but reversed dispersion of the hologram, resulting in a first-order correction of its dispersion. In accordance with a further feature of my invention, I provide a novel, inexpensive and reasonably efficient diffraction grating which can be used in my viewing device by closely superimposing several thin, inexpensive transmission gratings so that their grooves are parallel. I have found that up to a limit, increasing the number of superimposed transmission diffraction gratings increases the intensity of the radiation in the desired diffracted orders.

My invention will now be described with greater detail, reference being had to the accompanying drawings wherein.

Figure 1:
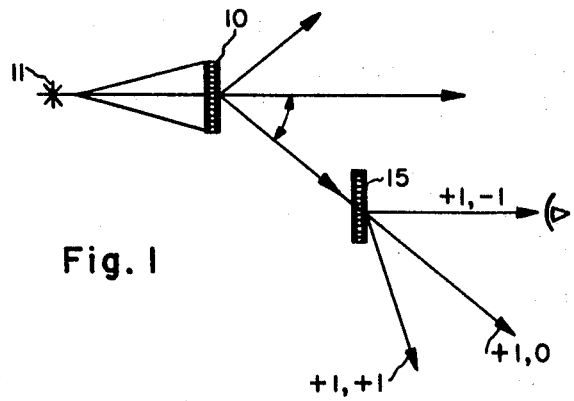
FIG. 1 is a schematic view of one form of my viewing device in accordance with the invention.

Referring now to the drawing, one form of my white light hologram viewing device is illustrated in FIG. 1. The hologram is designated by reference numeral 10, and is shown essentially in an edge view of the transparency; the plane of the transparency being vertical and perpendicular to the plane of the drawing. The hologram is illuminated from a concentrated white light source 11, which may be, for example, a 100-watt zirconium arc point source. Other concentrated white light sources such as ordinary lamps and flashlights can also be employed. In this particular case, the hologram was on a Kodak 649F plate recorded using a 6328 A. laser light with a recording angle of 29° in a horizontal plane. In the optical path emanating from the hologram are generated the virtual and real images in the positive and negative order, both of which are illustrated in FIG. 1 for a single wavelength. The image information is of course only in the first-order diffracted beams and no useful information is in the zero-order primary beam; however these diffracted beams are highly dispersed. In the path of the +1 virtual image beam is provided a plane transmission diffraction grating 15. I have used for this purpose from one to four superimposed layers of inexpensive plastic grating replicas with a spacing of 13,400 lines/inch. This line spacing is approximately equal to the average fringe spacing in the hologram (reciprocal of the spatial carrier frequency) to obtain equal but opposite angular dispersion. To maintain equal magnitude angular dispersion, the plane of the grating is oriented approximately parallel to that of the hologram, with the grating lines perpendicular to the plane of the recording angle in the hologram. As is illustrated, the grating 15 itself produces various transmitted beams corresponding to its different diffraction orders. The first-order diffracted wave from this grating 15 with a sign opposite to the first-order wave from the hologram (virtual image) is the compensated (doubly diffracted) wave for virtual image viewing. Obviously, similar compensation can be obtained for the real image obtained from the hologram. For many holograms, containing not too large an angular field of view, the compensated image will be almost entirely black and white, though a slight coloration may be present along the four sides, which shows that a vertical correction is generally unnecessary and the first-order horizontal correction is adequate. By adjustment of the angle and position of the grating 15, color balance can be shifted to either side. If the extended objects occupy a large angular field of view, the first-order dispersion correction over the entire visible region by a simple counterdispersion element may be inadequate. However, under this circumstance, considerable improvement can be obtained by reducing somewhat the spectral bandwidth over which the correction is required. This is accomplished by simply introducing in the optical path preferably before, though it can be after the hologram, a broadband filter. I have used very effectively for this purpose a filter having a band-pass of 250 A. which if used alone without the grating 15 would result in very poorly resolved images. Of course, some reduction in image intensity will result from the combined correction system and a colored rather than a black and white image will be produced.

The embodiment described employed a transmission type grating. It is evident that reflection type gratings are similarly useful. In the same manner, I prefer to position the reflection grating so that it intercepts the highly dispersed plus first-order diffracted beam from the hologram, and view the minus first order of the grating, which has the opposite angular dispersion, the magnitude of which dispersion being chosen to obtain the desired correction. I have demonstrated this using a first-order blazed reflection grating, blazed for first order at 5500 A., having 600 lines/mm. for viewing a conventional two-beam hologram from an incandescent white light source. As will be appreciated by those skilled in this art, such a simple compensation is possible because most of the dispersion caused by a two-beam hologram is in one plane, namely that defined by the signal and reference beams. It will be further understood that the undispersing element can be used as a predispersing element by placing it between the source and the hologram thereby illuminating the hologram with a line spectrum of the source whose dispersion is substantially equal and opposite to that caused by the hologram.

Figure 2:
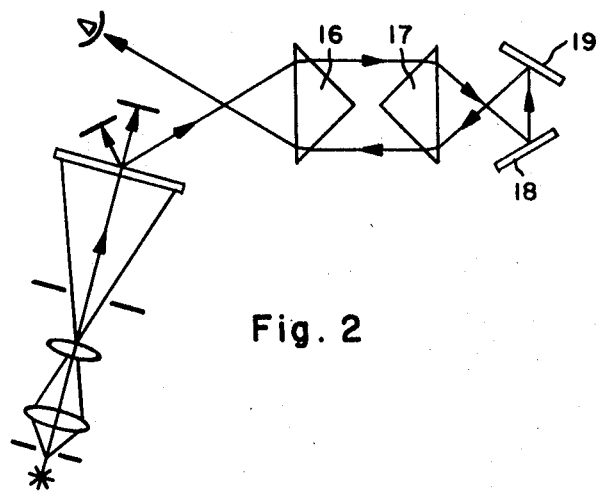
FIG. 2 is a modification thereof.

It will further be evident to those skilled in this art that any undispersing element capable of providing a reverse dispersion of substantially the same magnitude of that of the hologram will enable the desired results to be achieved. FIG. 2 illustrates a modification using a series of prisms 16, 17 as the correcting optical element, with the prisms located in the plane of the two-beam hologram recording angle and their apex corners perpendicular to that plane. Since the prisms have smaller dispersion than the diffraction grating, more than one prism is generally necessary. In the particular embodiment illustrated, I have arranged the optical path, using mirrors 18, 19, for example, so that the beam doubles back whereby it passes through each prism twice in order to minimize the number of prisms required. I have obtained satisfactory results using three 45° low-index prisms oriented in series as the two 16 and 17 are shown in FIG. 2. The prisms are desirably set at the minimum deviation angle, since the virtual-image, first-order beam from the hologram is not collimated. Two or any even number of mirrors are necessary to double back the beam to avoid color reversal.

Figure 3:
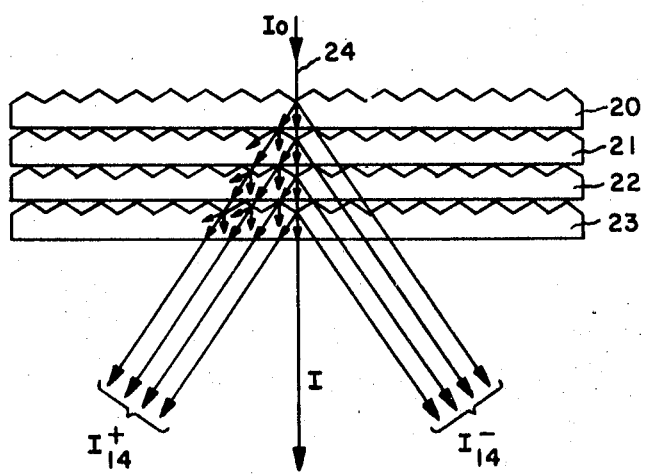
FIG. 3 shows one embodiment of my novel diffraction grating.

The embodiment illustrated in FIG. 1 employed a transmission diffraction grating. Bright images are obtained by the use of transmission gratings having high efficiency, which means that the incident light is predominately diffracted into a chosen diffraction order. It is conventionally obtained by a so-called blazed grating, which is however difficult to manufacture and hence expensive, especially for the visible region. I have found it possible to obtain a transmission grating of reasonable efficiency in a very inexpensive manner by using thin inexpensive grating replicas, which can be commercially obtained at very low cost in the form of large plastic sheets. These are not blazed, and hence their efficiency is poor. I have found that by closely superimposing several of these thin low efficiency transmission gratings, each of which has the same grating line density, and arranged so that their grooves are parallel, a considerable increase in the intensity of the light directed into all orders is obtained. FIG. 3 illustrates one form of this device comprising, for the sake of illustration, four contacting superimposed gratings designated 20, 21, 22 and 23. The incident beam is designated 24. As will be observed, part of the beam is diffracted into the various orders, of which the first orders are shown, but due to the low efficiency, most of the beam continues in a straight, undiffracted path after it passes through the first layer 20. The same phenomenon occurs at each successive layer of the pile. A first-order analysis of the arrangement illustrated in FIG. 3 shows that the ratio of the summed intensity in a first-order beam due to the action of $n$ such layers to the intensity in the same beam due to a single grating is given by $n(1-r-2f_1)^{n-1}$, where $r$ is the loss per layer and $f_1$ is the fraction of incident energy that is diffracted into a first-order wave by each grating. From this, it is evident that if the quantity $(1-r-2f_1)$ is greater than one-half, which is most often the case for the inexpensive replica transmission diffraction gratings, then increasing the number of layers will result in an increase in diffracted intensity over that from a single layer in all diffraction orders. From this analysis it can also be shown that the light intensity in any diffraction order ($i$) as a function of the number of layers present increases to a maximum when $n \, Ln \, (1-r-2f_1) = -1$, after which an increase in the number of layers causes a falling off of the intensity. For instance, if the factor $(1-r-2f_1)$ is 0.9, corresponding to a fairly inefficient grating (with $f_1$ at best 5 percent), then a pile of nine such layers will increase the light intensity in this first order by a factor of about 3.5. An advantage of this type of grating over the blazed grating is that the blaze is cut for a particular wavelength, whereas the pile of unblazed gratings works substantially the same for all wavelengths. This is especially important for the white light viewing devices described above.

While I have described my invention in connection with specific embodiments and applications, other modifications thereof will be readily apparent to those skilled in this art without departing from the spirit and scope of the invention as defined in the appended claims.

What is claimed is:

1. An inexpensive transmission grating exhibiting improved efficiency comprising a pile of superimposed, aligned, nonblazed thin transmission diffraction gratings having straight grooves, said gratings having the same grating line density and arranged with their grooves parallel to one another.

2. A grating as set forth in claim 1 wherein each of the grating layers is a thin plastic replica.